United States Patent [19]

Fierthaler

[11] Patent Number: 4,984,707

[45] Date of Patent: Jan. 15, 1991

[54] THERMALLY INSULATED BEVERAGE MUG

[76] Inventor: Frederick Fierthaler, Perch Pond Rd. R.D. #1, Box 133, Nineveh, N.Y. 13813

[21] Appl. No.: 384,535

[22] Filed: Jul. 25, 1989

[51] Int. Cl.⁵ .............................................. B65D 90/04
[52] U.S. Cl. .................................... 220/412; 220/413; 220/335; 220/90.2; 200/217
[58] Field of Search ............... 220/412, 413, 335, 90.2; 206/217

[56] References Cited

U.S. PATENT DOCUMENTS

| | | | |
|---|---|---|---|
| 2,750,768 | 6/1956 | Laurent | 220/94 A |
| 2,833,436 | 5/1958 | Ruderian | 206/217 |
| 3,066,819 | 12/1962 | Cox | 220/94 A |
| 3,910,461 | 10/1975 | Eager | 220/412 |
| 4,127,211 | 11/1978 | Zerbey | 220/69 |
| 4,164,284 | 8/1979 | Witt et al. | 206/217 |
| 4,595,113 | 6/1986 | Fafflok et al. | 220/412 |
| 4,626,382 | 12/1986 | Stritzke et al. | 220/412 |
| 4,676,385 | 6/1987 | Zimmermann | 220/94 X |
| 4,735,333 | 4/1988 | Lay et al. | 220/90.2 |
| 4,815,999 | 3/1989 | Ayon et al. | 206/457 |

Primary Examiner—Joseph Man-Fu Moy
Attorney, Agent, or Firm—Salzman & Levy

[57] ABSTRACT

The invention features a thermally insulated beverage mug having a hollow internal walled section for retarding thermal conductivity between inner and outer vessel walls. The beverage mug also features a hinge mechanism and domed lid for closing the mouth of the vessel when the vessel is not in use.

8 Claims, 2 Drawing Sheets

THERMALLY INSULATED BEVERAGE MUG

FIELD OF THE INVENTION

This invention relates to beverage mugs, and more particularly to a domed beverage mug having insulative properties for maintaining the temperature of the liquid contained therein.

BACKGROUND OF THE INVENTION

A heightened awareness of health has recently led people to demand better sanitary conditions for food and beverage than has heretofore been accepted. For example, insects and particulate matter with their inherent potential for carrying especially virulent, transmitted diseases are unwelcomed intrusions into conventional drinking glasses and cups. Today's public increasingly does not tolerate unclean conditions that were once commonplace.

Partially in response to this demand, beverage mugs and lidded beer steins are becoming popular again with the drinking public. These vessels hold large quantities of liquid making them ideally suited for picnics and parties at pools and backyards.

Unfortunately, the very fact that such beverage mugs and beer steins have a greater storage capacity causes a problem: liquid contained in them over a significant length of time tends to reach undesirable, ambient temperature, wherein cold items become warmer and hot items become cooler.

The present invention is a beverage mug that has many improved features, including a domed lid that traverses a wide rotative arc in excess of ninety degrees of rotation between the closed mouth position and the open position.

This wide angle of arc provides the advantage of keeping the lid out of the way during drinking, such that it will not interfere with the drinker's face.

Another improvement of this invention includes an insulative design that maintains the liquid at its proper temperature (hot or cold). The mug includes walls made from thermally insulative materials such as polyethylene and polystyrene. The walls of the mug can also comprise an internal hollow cavity to retard heat transfer through the walls. The internal cavity may contain air, styrene foam, urethane foam, or can be evacuated to provide a thermos effect.

The vessel of the beverage mug has a frustro-conical shape to provide stability against tipping over.

A thumb actuator in the form of an elliptical ball allows for ease of lid movement.

SUMMARY OF THE INVENTION

The invention pertains to a thermally insulated beverage mug for maintaining beverage temperatures. The mug comprises a frustro-conical hollow vessel for receiving and dispensing a beverage through its mouth portion.

A handle is disposed on the side of the vessel and has a horizontal handle arm in its top portion. This horizontal handle arm allows for a hinge mechanism to be strapped on top of the handle.

A domed, articulated lid is disposed on top of said mouth portion of the vessel in a first closed mouth position. The lid is rotatively movable from the first, closed mouth position to a second open mouth position through a rotative arc in excess of 90 degrees, and preferably about 110 degrees.

A right angled hinge connects the domed lid to the horizontal handle arm. The hinge mechanism comprises a vertical hinge arm strapped to the handle and a horizontal hinge arm that is riveted to the lid. The horizontal hinge arm is rotatively pinned to the vertical hinge arm at a hinge fulcrum.

The horizontal hinge arm has a strap abutment that mates and engages with a limit abutment on the vertical hinge arm. The stop and limit abutments have an open angle in excess of 90 degrees from the first, closed mouth position of the lid.

A thumb actuator disposed in a vertical position directly over the vertical hinge arm is integrally attached to the horizontal hinge arm. The thumb actuator has an elliptical ball shape and causes the lid to move through its rotative arc from the first to the second position.

The vessel of the mug can have a hollow space between its inner and outer walls for retarding thermal conductivity through the vessel walls. The hollow space may contain air (a good thermal insulator), styrene foam or urethane foam. The hollow space can be evacuated to provide a thermos effect.

It is an object of this invention to provide an improved beverage mug.

It is another object of the invention to provide an insulated mug for maintaining beverage temperature.

It is another object of the invention to provide a thermal beverage mug having attractively aesthetic characteristics.

It is still another object of the present invention to provide a means for precluding the intrusion of foreign matter into the contained beverage.

It is a further object of this invention to provide a mug with a domed lid that has a wide angle of rotative arc, so that the lid will not interfere with the face of the drinker during the drinking of the beverage.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Generally speaking, the invention features an insulated beverage mug having a domed lid with a wide angle of rotation to prevent interference with the face of the drinker during the drinking of the beverage.

For purposes a brevity, like components will bear the same designation throughout the figures.

Figure 1:
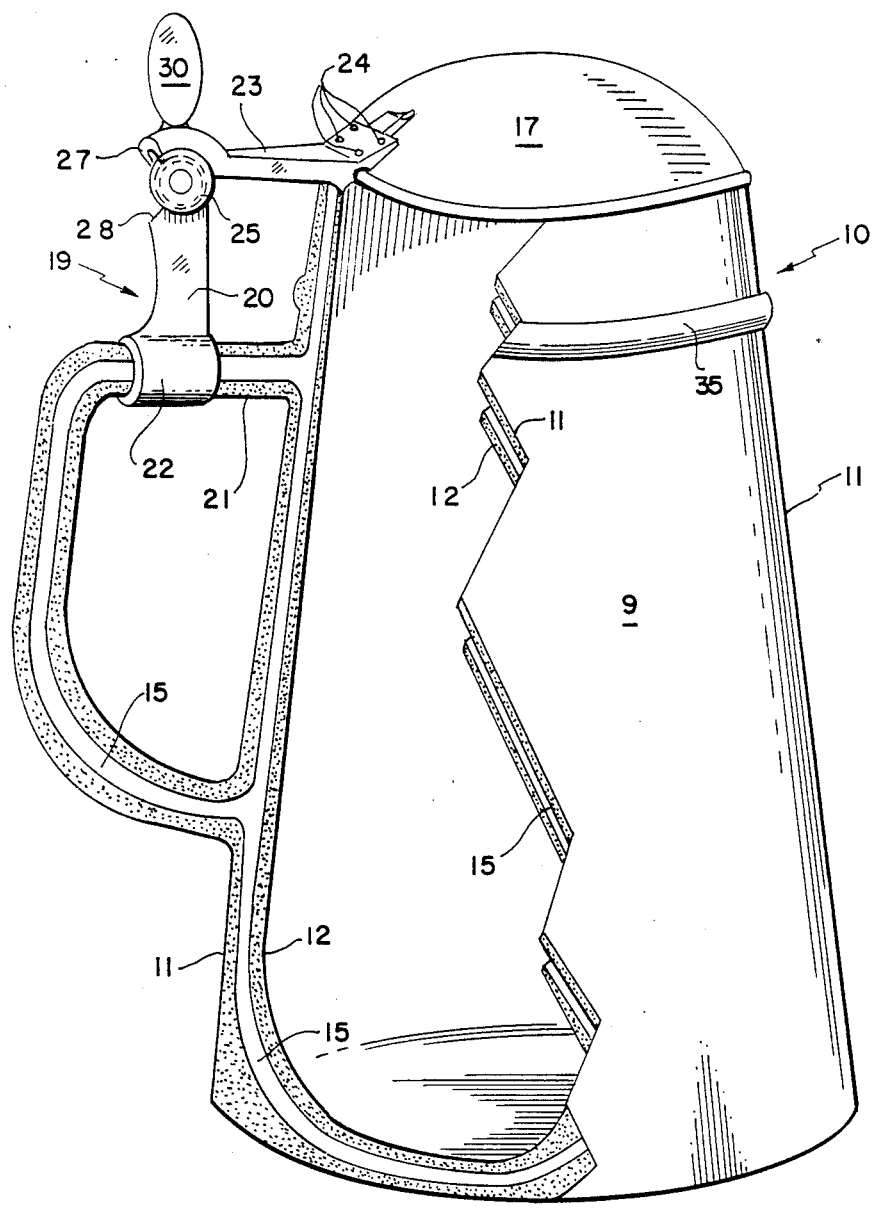
FIG. 1 is a perspective view of the beverage mug of the invention, shown with its domed lid in a closed position.

Referring now to FIG. 1, the drinking mug 10 of this invention is shown. The mug 10 comprises a frustro-conical container 9 having an outer wall 11 and an inner wall 12 that defines an inner cavity 13 for receiving and dispensing liquids.

A handle 14 is disposed on the side of vessel 9 and is integrally formed therewith.

The vessel 9 and handle 14 can be molded from a solid plastic or a plastic having a hollow space 15 therein.

The hollow space 15 can be filled with air, which is a good thermal insulator, or with a foam material, such as a styrene or urethane foam.

The hollow space 15 can also be evacuated to provide a thermos effect.

Figure 2:
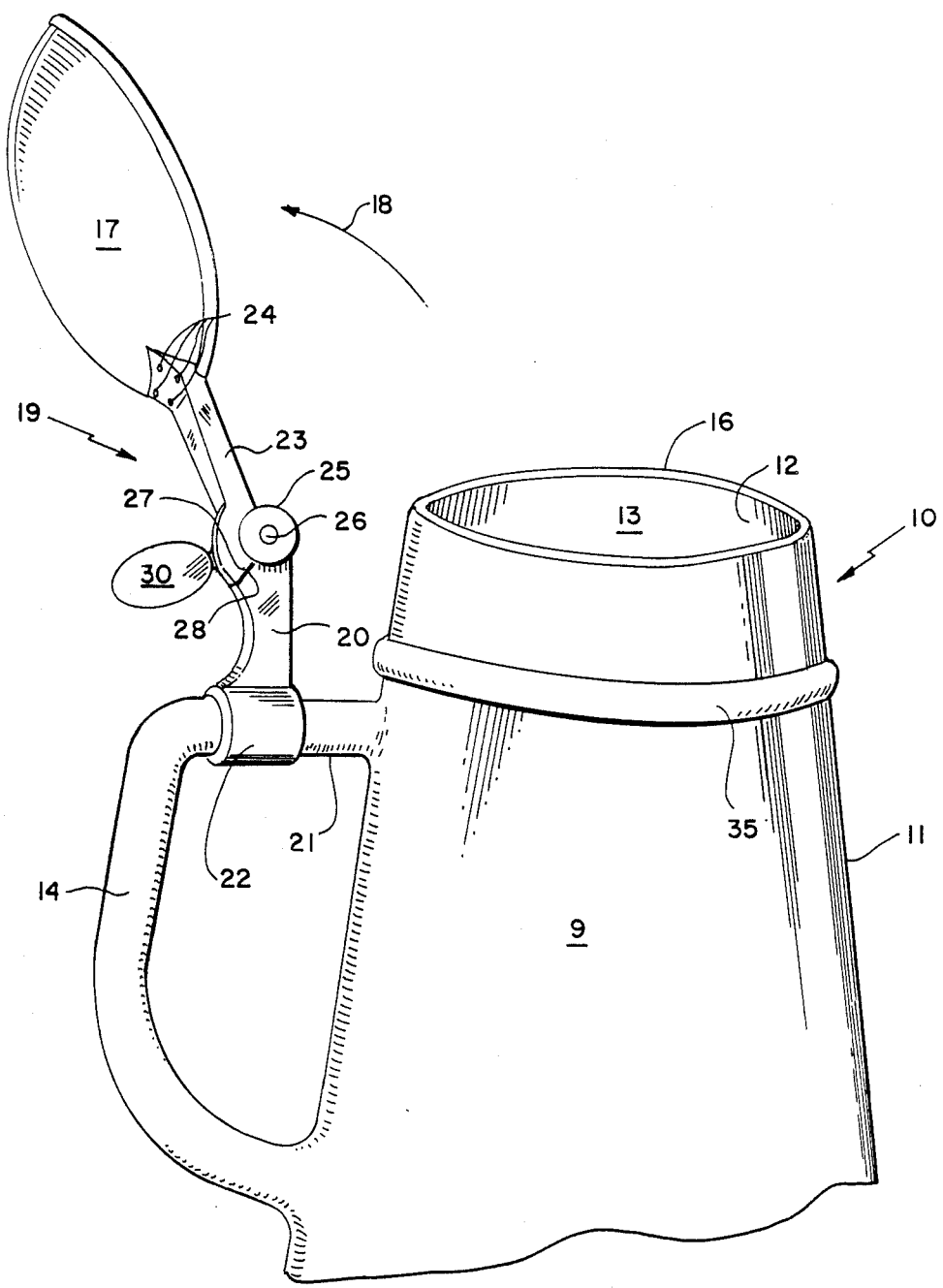
FIG. 2 is a partial perspective view of the beverage mug of FIG. 1, illustrating the domed lid in an open position.

The mouth 16 (FIG. 2) of vessel 9 is covered in a closed mouth position (FIG. 1) with a domed lid 17, which is rotated (arrow 18) out of the way in the open mouth position, shown in FIG. 2.

The lid 17 is rotated by means of a hinge mechanism 19.

The hinge mechanism 19 includes a vertical arm 20 that is strapped to a horizontal arm 21 of handle 14 via cylindrical strap member 22.

The vertical hinge arm 20 rotatively supports a horizontal hinge arm 23 attached to dome lid 17 via rivets 24. It should be understood that hinge arm 23 may also be attached to lid 17 by means of screws or any other suitable mechanical or space age adhesive means.

Figure 3:
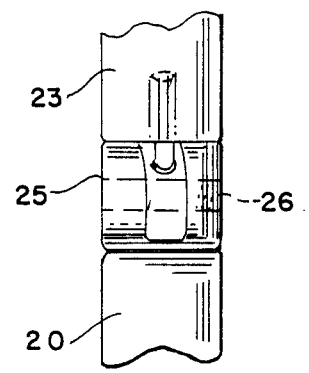
FIG. 3 is a partial, enlarged, expanded view of the hinge pin section of the hinge mechanism of the beverage mug of FIGS. 1 and 2.

The horizontal hinge arm 23 rotates about the hinge fulcrum 25 provided by hinge pin 26, shown in more detail in FIG. 3.

The horizontal hinge arm 23 terminates in a stop abutment 27 that engages with a limit abutment 28 disposed at the top of vertical hinge arm 20. These abutments 27, 28 limit the rotative arc of travel of lid 17, which is approximately 110 degrees from the closed mouth position of FIG. 1.

It should be understood that other mechanisms known in the art can be used to attach hinge mechanism 19 to mug 10. Such mechanisms may include, but are not necessarily limited to, metal straps, blocks and pins configurations.

The lid 17 is actuated for rotation (arrow 18) by means of a thumb knob 30 that has an elliptical ball shape.

The lid 17 is returned to its closed position, as shown in FIG. 1, by means of upward pressure on elliptical thumb knob 30.

The container 9 can be molded from thermal plastics, such as polyethylene and polystyrene.

A circumferential rim or lip 35 can be molded into wall 11 to support the mug 10, making it less unwieldy during use. The lip 35 is approximately ¼" wide, 1/16" thick and is rounded for the user's comfort. The preferred position of the lip 35 is approximately ¾" from the mouth 16.

Having thus described the invention, what is desired to be protected by Letters Patents is presented by the subsequently appended claims.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A thermally insulated beverage mug, comprising:
 a frustro-conical vessel having a hollow chamber for receiving and dispensing liquids, said chamber defined by an inner wall, an outside of said vessel defined by an outer wall, said frustro-conical vessel having a mouth portion defined by a circular rim and having means defining a hollow section disposed between said inner and outer walls for retarding heat conductivity between said inner and outer walls, said hollow section being disposed substantially throughout a body section and a handle section;
 means defining a circumferential rim disposed on said outer wall of said vessel, below said mouth portion;
 said handle section connected to said body section of frustro-conical vessel for lifting said vessel;
 a domed lid disposed over said mouth portion of said vessel in a closed mouth position and being free to move to an open mouth position, said domed lid being articulated for movement about said handle to which it is movably attached;
 a right-angled hinge disposed between said domed lid and said horizontal handle arm, said hinge having a substantially vertical hinge arm strapped to said horizontal handle arm and a substantially horizontal hinge arm attached to said domed lid, said horizontal hinge arm being rotatively pinned at a hinge funcrum to said vertical hinge arm and having a stop abutment for mating engagement with a limit abutment on said vertical hinge arm, said stop and limit abutments having an open angle of approximately 110 degrees of arc relative to said closed mouth position of said lid; and
 a thumb actuator disposed in a substantially vertical position directly over said vertical hinge arm and integrally attached to said horizontal hinge arm for rotating said domed lid through the approximately 110 degrees of arc from said closed position to said open position.

2. The thermally insulated beverage mug of claim 1, wherein said hollow section is filled with air.

3. The thermally insulated beverage mug of claim 1, wherein said hollow section is filled with styrene foam.

4. The thermally insulated beverage mug of claim 1, wherein said hollow section is filled with urethane foam.

5. The thermally insulated beverage mug of claim 1, wherein said hollow section is evacuated to provide a thermos effect.

6. The thermally insulated beverage mug of claim 1, further comprising a hinge mechanism for attaching said domed lid to said handle.

7. The thermally insulated beverage mug of claim 6, wherein said hinge mechanism provides said domed lid with arcuate movement in excess of 90 degrees of arc.

8. The thermally insulated beverage mug of claim 1, wherein said rim is rounded for user comfort.

* * * * *